July 17, 1962      J. SHESTA      3,044,257

COMBUSTION CHAMBER OUTER JACKET

Filed June 2, 1958

INVENTOR
JOHN SHESTA
BY William R. Wright
AGENT

United States Patent Office 3,044,257
Patented July 17, 1962

3,044,257
COMBUSTION CHAMBER OUTER JACKET
John Shesta, Highlands, N.J., assignor to Thiokol Chemical Corporation, Bristol, Pa., a corporation of Delaware
Filed June 2, 1958, Ser. No. 739,409
1 Claim. (Cl. 60—35.6)

The present invention relates to rocket thrust chambers of the type in which liquid propellants are burned and which are provided with wall cooling means.

The principal object of the invention is to provide an improved structural assembly for such a rocket thrust chamber and to provide a simplified and efficient method of fabrication therefor.

In carrying out the object of the invention, there is provided a plurality of metallic rings of substantially Z-shaped cross-section so dimensioned that they fit together in an overlapping stacked arrangement in the configuration of the outer wall of a rocket thrust chamber. The rings are brazed or welded to form an integral shell and within this shell there is located an inner chamber wall or shell of smaller diameter, spaced from the outer wall by a circle of conduits through which coolant passes between said outer and inner chamber walls.

Other objects of the invention will be pointed out in the following description and claim and illustrated in the accompanying drawings, which disclose, by way of examples, the principle of the invention and the best mode, which has been contemplated, of applying that principle.

Figure 1:
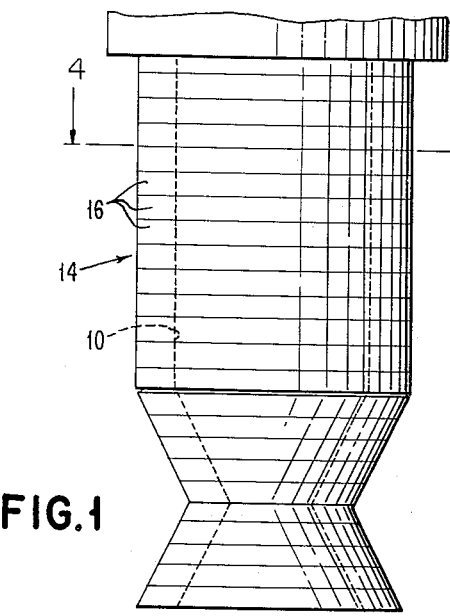
FIG. 1 is a front elevation of the chamber with the usual propellants injector mechanism removed.

Referring to the drawings, the rocket thrust chamber comprises an inner shell 10 of conventional outline and preferably formed of a single metallic sheet. Surrounding this shell 10 is a ring of tubes or conduits 12 extending parallel to the longitudinal axis of the shell 10 and which may be connected at their ends to suitable manifolds, from which coolant is circulated through the tubes.

Figure 2:
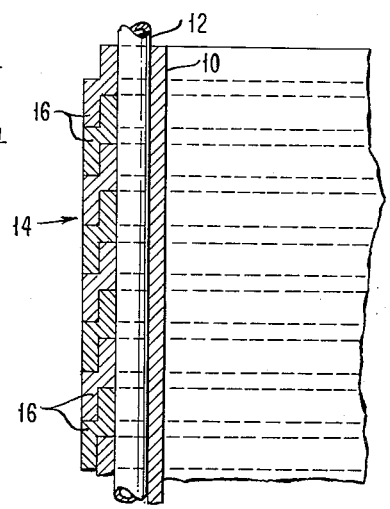
FIG. 2 is an enlarged view of the upper left hand corner of FIG. 1 shown in sectional elevation.
Figure 4:
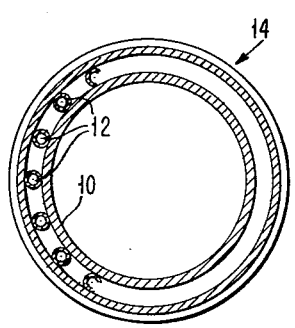
FIG. 4 is a section taken on line 4—4 of FIG. 1.
Figure 3:
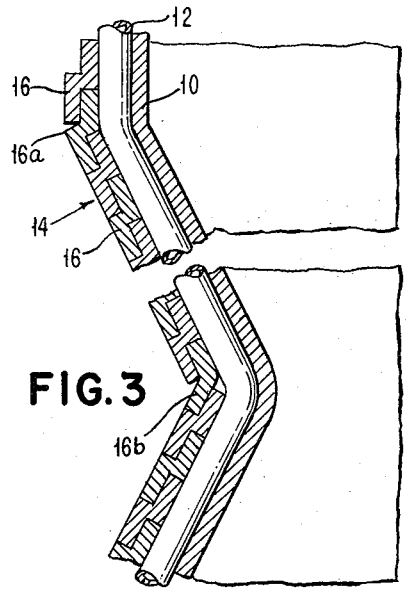
FIG. 3 is an enlarged sectional view showing the configuration of the rings at the points of bending of the chamber wall.
Figure 5:
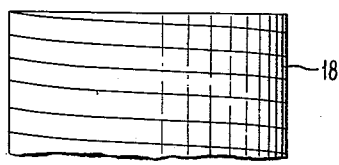
FIG. 5 is a view showing an alternative form in the configuration of a spiral band.

The present invention is primarily directed to the fabrication of the outer shell 14 surrounding the ring of tubes 12, and this shell is formed in the upper cylindrical part thereof by a plurality of rings 16, whose opposite edges are offset by the thickness of the ring so that, when assembled as shown in FIG. 2, they form a wall of double the thickness of the rings. At the points of convergence and divergence, the rings 16a and 16b respectively are suitably configured as shown in FIG. 3 to interlock with offset rings 16 extending along the converging and diverging sides of the nozzle end of the chamber.

Preferably, inner chamber shell 10 is produced by extrusion and rolling procedures to the required configuration of a rocket thrust chamber. Tubes 12 are then secured, after bending to shape, by spot welding and manifolded for coolant flow therethrough. Thereafter, rings 16, 16a and 16b are assembled around the rings with certain of those of least diameter being split and rewelded after assembly. After brazing or welding of the rings to one another, there results a unitary structure with a circumferential coolant passageway wherein coolant may flow in one direction through tubes 12 and in the opposite direction through the spaces therebetween.

A further manner of forming the outer shell consists in the provision of a continuous strip or band 18 which has a cross-section substantially similar to rings 16. One end of this strip is secured at the upper edge of the chamber and from this point the strip 18 is spirally wound around the circle of tubes in overlapping relationship throughout the length of the chamber. Thereafter, brazing will hold the wrapped srtip securely with the inherent advantage of strength both axially and in hoop tension.

By providing a substantial area of overlap, improved brazing surface is available and leakage through seams obviated.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

An outer wall structure for a rocket combustion chamber having a walled inner chamber, comprising a continuous band of substantially Z-shaped cross section wrapped in spiral and overlapping relation about said inner chamber whereby the resultant wrapping will produce parallel inner and outer surfaces in said outer wall structure, and means for spacing the outer wall from the wall of the inner chamber to provide a coolant passageway therebetween.

References Cited in the file of this patent

UNITED STATES PATENTS

| | | |
|---|---|---|
| 1,935,659 | Noack | Nov. 21, 1933 |
| 1,969,540 | Bergstrom et al. | Aug. 7, 1934 |
| 2,122,521 | Goddard | July 5, 1938 |
| 2,705,399 | Allen | Apr. 5, 1955 |
| 2,743,514 | Duecy | May 1, 1956 |
| 2,756,032 | Dowell | July 24, 1956 |
| 2,817,484 | Stenzel | Dec. 24, 1957 |
| 2,844,939 | Schultz | July 29, 1958 |
| 2,933,888 | Africano et al. | Apr. 26, 1960 |

FOREIGN PATENTS

| | | |
|---|---|---|
| 1,001,770 | France | Oct. 24, 1951 |
| 1,091,311 | France | Oct. 27, 1954 |
| 1,112,030 | France | Nov. 9, 1955 |